United States Patent [19]
Kurtz et al.

[11] Patent Number: 5,232,735
[45] Date of Patent: Aug. 3, 1993

[54] INGESTIBLES CONTAINING SUBSTANTIALLY TASTELESS SWEETNESS INHIBITORS AS BITTER TASTE REDUCERS OR SUBSTANTIALLY TASTELESS BITTER INHIBITORS AS SWEET TASTE REDUCERS

[75] Inventors: Robert J. Kurtz, New York, N.Y.; William D. Fuller, San Diego, Calif.

[73] Assignee: Bioresearch, Inc., Farmingdale, N.Y.

[21] Appl. No.: 531,388

[22] Filed: Jun. 1, 1990

[51] Int. Cl.$^5$ .............................................. A23L 1/22
[52] U.S. Cl. ..................... 426/649; 426/535; 426/536; 426/537; 426/538; 426/548; 426/648; 426/650; 426/658; 514/572
[58] Field of Search .............. 426/548, 649, 535, 536, 426/537, 538, 650, 658, 648; 514/572

[56] References Cited

U.S. PATENT DOCUMENTS

| | | |
|---|---|---|
| 3,903,235 | 11/1975 | Gusman et al. |
| 3,934,047 | 1/1976 | Schade ............................. 426/548 |
| 4,001,455 | 1/1977 | La Via et al. ....................... 426/548 |
| 4,154,862 | 1/1979 | Guadagni et al. |
| 4,216,244 | 9/1980 | Allen |
| 4,544,565 | 10/1985 | Barnett |
| 4,567,053 | 6/1986 | Lindley |
| 4,642,240 | 4/1987 | Barnett et al. |
| 4,871,570 | 10/1989 | Barnett et al. |
| 4,910,031 | 12/1990 | Budd et al. |
| 4,913,921 | 2/1990 | Schroeder et al. |
| 4,917,913 | 9/1990 | Buckholz et al. |
| 4,988,532 | 1/1991 | Buckholz, Jr. et al. ............. 426/536 |
| 4,994,490 | 2/1991 | Roy et al. ............................ 426/548 |

FOREIGN PATENT DOCUMENTS 2157148A 7/1985 United Kingdom.

Primary Examiner—Jeanette Hunter
Assistant Examiner—Mary S. Mims

[57] ABSTRACT

Sweetness inhibitors which are substantially tasteless have been found to be bitter taste inhibitors or blockers. Conversely, bitter taste inhibitors which are substantially tasteless have been found to be sweet taste inhibitors or blockers.

8 Claims, No Drawings

INGESTIBLES CONTAINING SUBSTANTIALLY TASTELESS SWEETNESS INHIBITORS AS BITTER TASTE REDUCERS OR SUBSTANTIALLY TASTELESS BITTER INHIBITORS AS SWEET TASTE REDUCERS

BACKGROUND OF THE INVENTION

This invention relates in general to bitter taste and sweet taste blockers or inhibitors. More particularly, the invention relates to the use of substantially tasteless sweetness inhibitors to reduce or block bitter taste and the use of substantially tasteless bitterness inhibitors to reduce or block sweet taste.

The desirability of reducing the sodium intake of humans is well documented. An excessive intake of sodium has been linked to high blood pressure and premature heart attack. This problem has been addressed by numerous researchers in a variety of ways over the past two decades.

There are numerous compounds that are known to be salty but have problems associated with the use as salt substitutes. Potassium chloride has a pronounced bitter aftertaste and ammonium chloride has, at least in some people, a fishy taste associated with it. Lithium chloride, although a good tasting salt is highly toxic.

At the current time, reduction of sodium intake is achieved via a combination of abstinence and/or the substitution of potassium chloride for sodium chloride. There are a variety of products on the market today utilizing potassium chloride as a saltening agent. All of these salt substitutes rely on ingredients which mask the bitter taste of potassium chloride. These highly flavorful ingredients consist of items such as onion, garlic, paprika, red pepper, chili powder and many other spices. None of these products has found wide-spread acceptance.

The only other potential sodium reduction mechanism currently available, but not yet on the market, are the recently disclosed dipeptide-type molecules described by Tamura et al in Agrico. Biol. Chem. 53 (6), 1625–1633, 1989, which are not salt substitutes but are allegedly salt enhancers. They may intensify the salty taste of sodium chloride, perhaps allowing for the reduction in total sodium intake. These molecules have yet to be proven useful for reducing sodium intake.

SUMMARY OF THE INVENTION

An abundance of literature exists on the study of the perception of taste, particularly in the area of sweet taste. Over the past two decades, numerous researchers have attempted to develop new non-caloric sweeteners. This work began in earnest following the introduction of Aspartame (L-aspartyl L-phenylalanine methyl ester) several years ago. As a result of this work, a large variety of sweet molecules are now known.

There has been a substantial amount of work during this time on the perception of sweet taste, as well as an interaction of molecules with the receptor site for sweet taste. All of this work clearly points to one feature. The sweet receptor site and the bitter receptor site are in close proximity and/or related to one another. It is now known, for example, that if sweet molecules are altered slightly, particularly in their spacial arrangements and/or orientation, they may become bitter or tasteless. Frequently, alterations in a molecule will change it from any one of these (sweet, bitter or tasteless) to any of the others (hereinafter referred to as "transformation(s)"). Consequently, it occurred to us that the perception of sweet and the perception of bitter are very likely associated with the same receptor, part of the same receptor site or very closely spatially related sites.

This feature is well illustrated in the case of the dipeptide-like sweeteners. For instance, L-aspartyl L-phenylalanine methyl ester (Aspartame) is intensely sweet. Whereas, L-aspartyl D-phenylalanine methyl ester is bitter. These "transformations" extend to almost all of the known dipeptide classes of sweeteners, including the aspartyl-D-alanine amides where the aspartyl-D-alanine alkyl amide are sweet and the corresponding L-amides are bitter. A similar set of examples exist for the amino malonic acid derivatives, the aspartyl alanine esters and most other classes of sweetener compounds. These facts lead us, for example of one transformation, to the conclusion that:

A. if a molecule possessed similar spacial arrangements to known sweeteners; and
B. with slight alterations the molecule could be made essentially tasteless (i.e., essentially neither sweet nor bitter—leaving aside aftertastes)

that such compounds should interact with the receptor site much the way a sweet or bitter tasting compound would interact but without the associated taste. If this could be done, then this tasteless molecule would inhibit the entrance of other molecules into the adjacent receptor site. Consequently, we concluded and discovered the following:

A. If the molecule is a sweet inhibitor and substantially or essentially tasteless, it not only inhibits or reduces the sweetness of substances, but also inhibits or reduces the bitter taste sensation; and
B. If the molecule is a bitter inhibitor and substantially or essentially tasteless, it not only inhibits or reduces the bitter taste of substances, but also inhibits or reduces the sweet taste sensation.

Thus, according to the present invention, it has been found that sweetness inhibitors that are substantially tasteless are effective bitter taste inhibitors for ingestible substances having a bitter taste characteristic.

Also, according to the present invention, it has been found that bitterness inhibitors that are substantially tasteless are effective sweetness taste inhibitors for ingestible substances having a bitter taste characteristic.

In addition, it has been found that when the ingestible substance possesses desirable characteristics, for example, a salty and/or sour taste, these desirable characteristics are not inhibited or adversely affected by the tasteless sweetness inhibitors and/or tasteless bitter inhibitors of the invention.

It has further been found that a certain class of sweetness inhibitors, i.e., a certain series of aralkyl carboxylic acid salts, described below, when used in sufficient amounts with mixtures of potassium chloride and sodium chloride or ammonium chloride not only block or inhibit the bitter taste of potassium chloride but also enhance the salty taste of sodium chloride or ammonium chloride.

By the term "substantially tasteless" as used herein and the appended claims is meant "essentially neither sweet nor bitter". The aftertaste, if any, is not included in this definition. It is essentially neither bitter nor sweet in the initial taste.

By the term "sweetness inhibitor" as used herein and the appended claims is meant a compound which, when mixed with an ingestible compound or composition naturally possessing or provided with a sweet taste, reduces or eliminates the perceived sweetness.

DETAILED DESCRIPTION OF THE INVENTION

Sweetness Inhibitors as Bitter Taste Reducers

The sweetness inhibitors useful in the present invention are those compounds of the prior art which are sweetness inhibitors and substantially tasteless. In many instances, sweetness inhibitors of the prior art which are not tasteless can be rendered substantially tasteless by slightly altering the sweetness inhibitor molecule as, for instance, by isomeric molecular reorientation or by the addition or substitution in the inhibitor molecule of various groups.

Illustrative of suitable classes of sweetness inhibitors contemplated for use as bitter taste blockers or reducers are the following:

A. Aralkyl carboxylic acid salts having the structure:

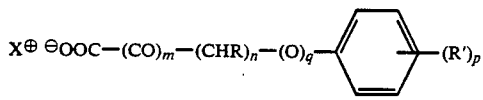

wherein m represents 0 or 1, and where m represents 0, n represents 1, 2 or 3 and p represents 1, 2, 3 or 4, and when m represents 1, n represents 1 or 2 and p represents 0, 1, 2, 3 or 4; q represents 0 or 1; R represents H or a lower alkyl (e.g. of $C_1$–$C_3$ alkyl); the substituents R', which may be the same or different, each represents a lower alkoxy group e.g. with 1 to 5 carbon atoms, phenoxy group or a lower alkyl or trifluoromethyl group; and/or two substituents R' together represent an aliphatic chain linked to the phenyl ring at two positions, either directly or via an oxa-group, e.g. an alkylenedioxy, alkenylenedioxy, alkylenoxy or alkenylenoxy group; and/or one substituent R' represents a hydroxy group while at least one other substituent R' represents an alkoxy group; and $X^{\oplus}$ represents a physiologically acceptable cation.

The $X^{\oplus}$ in the structure is preferably an alkali metal, alkaline earth metal or ammonium cation. Particularly preferred cations are sodium and potassium. The group R' is preferably in the 3-and/or 4-position and is preferably methoxy.

Compounds within this class of sweetness inhibitors and their preparation are described in U.S. Pat. No. 4,567,053, hereby incorporated by reference. Examples of compounds within this class are:

2-(4-methoxyphenoxy)propanoic acid
4-methoxyphenoxyacetic acid
2(4-methoxyphenyl) propionic acid
2-(4-ethoxyphenoxy) propionic acid
3-(3,4-dimethoxyphenoxy) propionic acid
3-(3,4-dimethoxyphenyl) propionic acid
3-(2,3,4-trimethoxyphenoxy) propionic acid
3-(2-methoxyphenyl)propionic acid
1,4-benzodioxan-6-acetic acid
3-(2,3,4-trimethoxyphenyl) propionic acid
3-(3,4,5-trimethoxyphenyl) propionic acid
3-(4-methoxyphenyl) propionic acid
4-(4-methoxyphenyl) butyric acid
2-methoxyphenylacetic acid
3-methoxyphenylacetic acid
4-methylphenylacetic acid
4-trifluoromethylphenylacetic acid
phenylpyruvic acid
2,3-dihydroxybenzoic acid
2-hydroxy-4-aminobenzoic acid
3-hydroxy-4-aminobenzoic acid
3-(4'-methoxybenzoyl) propionic acid
3-(2',4'-dimethoxybenzoyl) propionic acid
3-(3',4'-dimethoxybenzoyl) propionic acid
3-(4'-methoxybenzoyl)-2-methylpropionic acid
3-(4'-methoxybenzoyl)-3-methylpropionic acid
3'(4'-methoxybenzoyl)-2,3-dimethylpropionic acid, and the physiologically acceptable salts thereof Sweetness inhibitors of this class have also been found to enhance salt taste. Thus, effective amounts of these compounds can be used in conjunction with mixtures of bitter substances such as potassium chloride with sodium chloride and/or ammonium chloride to both reduce the bitter taste and to enhance the salt taste of the sodium or ammonium chloride.

B. The general class of compounds denoted by the structure:

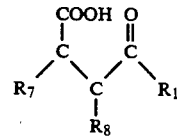

wherein $R_7$ is selected from the group consisting of hydrogen and $C_1$–$C_3$ alkyl, $R_3$ is selected from the group consisting of hydrogen and $C_1$–$C_3$ alkyl and wherein $R_1$, is the group

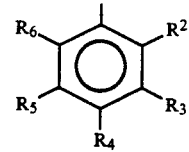

wherein $R_2$, $R_3$, $R_4$, $R_5$ and $R^6$ are independently selected from the group consisting of hydrogen, $C_1$–$C_3$ alkyl, $C_1$–$C_3$ alkoxy, $C_1$–$C_{12}$ hydroxyalkyl, hydroxy and COOH; and the physiologically acceptable salts thereof.

Compounds within this class of sweetness inhibitors are described in U.S. Pat. No. 4,544,565, hereby incorporated by reference. Illustrative members of this class include 3-(3',4'-dimethylbenzoyl)propionic acid,
3-(2',4'-dimethylbenzoyl)propionic acid,
3-(2'-methyl,4'ethylbenzoyl)propionic acid,
3-(2',4',6'-trimethylbenzoyl)propionic acid,
3-(4'-carboxybenzoyl)propionic acid,
3-(4'-hydroxybenzoyl)propionic acid,
3-(3'-methyl,4'-hydroxybenzoyl)propionic acid,
3-(2',4'-dihydroxybeonzoyl)propionic acid;
3-(2',4'-dihydroxy,6'-methylbenzoyl)propionic acid,
3-(3'-methyl,4'-methoxybenzoyl)propionic acid,
3-(3'-methyl,4'-ethoxybenzoyl)propionic acid,
3-(4'-methoxybenzoyl)propionic acid,
3'(4'-ethoxybenzoyl)propionic acid,
3-(3',4'-dimethoxybenzoyl)propionic acid, and
3-(2',4'-dimethoxybenzoyl)propionic acid.

C. The class of compounds the structure:

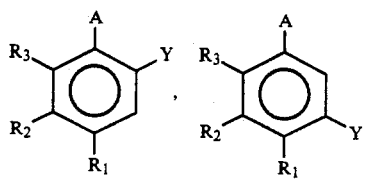

wherein A is COOH; SO₃H or H; Y is hydroxyl; and R₁, R₂ and R₃ are H or alkyl from 1 to 3 carbons, cyclopropyl, OH, OCH₃, OCH₂CH₃, CH₂OCH₃, CH₂CH₂OH, CH(CH₃)CH₂OH, CHO, COCH₃, CH₂CHO, COOH, CH₂COOH, COOCH₃, OCOCH₃, CONH₂, NHCHO, F, Cl, Br, I, CF₃, SCH₃, SCH₂CH₃, CH₂SCH₃, SO₃H, SO₂NH₂, SOCH₃, CH₂SO₃H and CH₂SONH.

Members of this class of sweetness inhibitors are described in U.S. Pat. No. 4,871,570, hereby incorporated by reference. Illustrative compounds within the above structure include:
2,4-dihydroxy benzoic acid,
3-hydroxy-4-methoxy benzoic acid,
3,5-dihydroxy benzoic acid,
2,3-dihydroxy benzoic acid,
2-hydroxy-4-aminobenzoic acid, and
3-hydroxy-4-aminobenzoic acid.

D. The class of sweetness inhibitors having the structure:

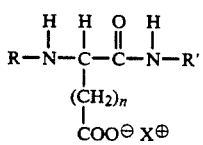

wherein n is 0, 1 or 2; R is H or an electron withdrawing group, preferably a ureido group, a guanidino group, a urethane group, cyanophenyl group, a nitrophenyl group and the like; R' is a group selected from alkyl (e.g. lower alkyl), aryl, aralkyl, alkaryl (preferably of 6-20 carbon atoms),

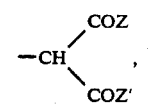

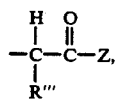

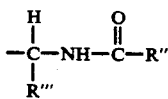

wherein Z and Z' are the same or different and are selected from OH, OR", NH₂, NHR", N(R")₂, wherein R" is alkyl, aryl, aralkyl, alkaryl, cycloalkyl, alkyl substituted cycloalkyl (preferably from 4 to 20 carbon atoms) and R'" is H, lower alkyl branched lower alkyl, aryl, aralkyl, alkaryl, or an amino side chain (e.g. one of the 20 common amino acids) attached via an amino group.

X⊕ is a physiologically acceptable cation, preferably an alkali metal, alkaline earth metal or ammonium cation.

Illustrative of compounds in this class include:
L-aspartyl-L-phenylalanine
aminomalonyl-L-phenylalanine

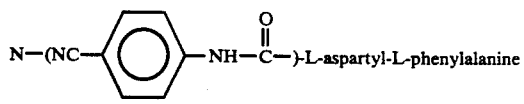

L-aspartyl-D-alanine
L-aspartyl-D-serine
L-glutamyl-L-phenylalanine

E. The class of sweetness inhibitors having the structure:

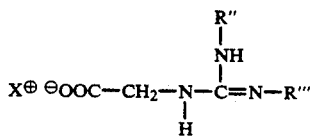

wherein R" and R'" are alkyl, cycloalkyl, aralkyl, alkaryl and aryl; and X⊕ is a physiologically acceptable cation, preferably an alkali metal, alkaline earth metal or ammonium cation. The preferred compounds are those wherein R" is CH₃ and R'" is

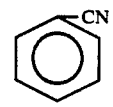

F. The class of sweetness inhibitors salts having the structure:

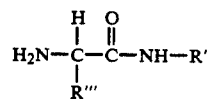

wherein R' and R'" are as hereinbefore defined in the Class "D" compounds above and the physiologically acceptable salts thereof.

Illustrative of this class of inhibitors are
L-methionyl-L-phenylalanine methyl ester
L-leucyl-L-phenalalanine methyl ester
L-seryl-L-phenylalanine methyl ester
L-methionyl-D-alanyl-tetramethylcyclopentyl amide
L-seryl-D-alanyl-tetramethylcyclopentyl amide
L-leucyl-D-alanyl-tetramethylcyclopentyl amide Many of the above tasteless sweetness inhibitor compounds exist as racemic mixtures of (+) and (−) optical isomers. It should be understood that the present invention contemplates use of the inhibitors in their racemate form or in the form of the individual isomers provided, of course, that the individual isomer possesses sufficient blocking activity. It is likely that one or the other of the optical isomers of the racemic sweetness inhibitors possess the greater, if not all, of the blocking or bitter taste-reducing activity. For example, it has been found that the (−) isomer of 2-(4-methoxyphenoxy)propionic acid possesses virtually all the bitter taste reducing activity and the (+) isomer virtually none. Use of the active or more active isomer alone is of advantage in that it enables use of far less inhibitor concentrations to gain the desired bitter taste reduction.

It has further been found that the class of sweetness inhibitors "A" described above, and in particular, 2-(4-methoxyphenoxy)propionic acid, in addition to inhibiting bitter taste also enhances the salty taste of sodium chloride and ammonium chloride, if employed in sufficient concentrations. Thus, the present invention contemplates the preparation of ingestible substances containing sodium chloride or ammonium chloride salts and the substantially tasteless sweetness inhibitors "A" in an amount sufficient to enhance the salty taste of the sodium chloride or ammonium chloride. Moreover, the present invention contemplates the preparation of ingestible products comprised of a mixture of a substance having a bitter taste such as potassium chloride and sodium or ammonium chlorides in conjunction with the substantially tasteless sweetness inhibitors "A" in an amount that both reduces the bitter taste and enhances the salty taste of the sodium or ammonium chlorides. Preferred ingestible admixture products of the invention comprise about 50 to 100% by weight of a bitter tasting substance such as potassium chloride and 0 to 50% by weight sodium chloride or ammonium chloride in combination with effective concentrations of sweetness inhibitors "A".

The concentration of sweetness inhibitor employed to reduce the bitter taste in any given instance will vary depending principally on the particular sweetness inhibitor selected, the particular bitter tasting substance, and the extent of bitter taste reduction desired. In most instances, concentrations of about 0.001 to 10% by weight, preferably about 0.05 to 3.5% by weight are satisfactory. When the sweetness inhibitor "A" is selected for use with an admixture of sodium chloride and/or ammonium chloride and a bitter tasting substance such as potassium chloride it will generally be necessary to employ at least 0.5% by weight up to 10% by weight of the inhibitor based on the sodium chloride or ammonium chloride to obtain both bitter taste reduction and salty taste enhancement of the sodium or ammonium chloride salt.

Bitterness Inhibitors as Sweet Taste Inhibitors

The bitterness inhibitors useful in the present invention are those compounds of the prior art which are known to inhibit bitter taste and which are substantially tasteless or which can be rendered substantially tasteless by isomeric molecular reorientation or by the addition or substitution of various groups in or on the molecule of the inhibitor. Illustrative of a suitable class of bitterness inhibitors is neodiosmin having the structure:

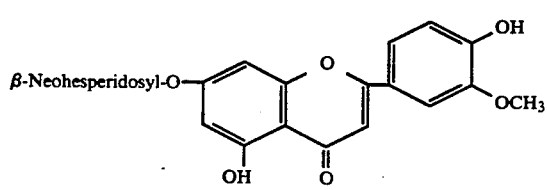

wherein β-neohesperidosyl is 2-O-α-rhamnopyranosly-β-D-glucopyranosyl. Neodiosmin is a known compound whose preparation and use as a debittering compound is described in U.S. Pat. No. 4,154,862.

Thus, ingestible products either naturally sweet or sweetened by the addition of natural sweetening agents can be reduced in sweetness according to the present invention by the addition thereto of effective sweetness-reducing amounts of a substantially tasteless bitterness inhibitor. In general, this concentration will fall in the range of about 0.001 to 10, preferably 0.05 to 3% by weight.

The ingestible substances to which the taste inhibitors of the invention can be added are without limitation and include both foodstuff and ingestible substances having essentially no food value such as pharmaceuticals, medicants and other ingestible chemical substances. Therefore, the sweetness inhibitors of the present invention are effective for use with all substances which have a bitter taste, while the bitterness inhibitors can be used with all substances sweetened with natural sugars. Illustrative of bitter substances with which the sweetness inhibitors of the invention can be used are potassium chloride, ammonium chloride, naringen, quinine and its salts, caffeine, urea, magnesium sulfate, sodium benzoate, saccharin, acetosulfames, aspirin and the like. Illustrative of foodstuffs having a sweet taste reducible by use of the tasteless bitterness inhibitors of the invention are the various natural sugars and foodstuffs such as beverages, candies, jellies, chocolates, cookies, cakes, sherbets, chewing gum and the like, containing same.

EXAMPLE 1

An aqueous solution containing 2.25% by weight potassium chloride and 0.078% by weight 2(4-methoxyphenoxy)propionic acid sodium salt in distilled water gave a relatively clean, salty taste with nearly all of the bitterness normally associated with potassium chloride eliminated. There was a slight non-objectionable sweet aftertaste.

EXAMPLE 2

An aqueous solution containing 2.25% by weight potassium chloride and 0.056% by weight 2(4-methoxyphenoxy)propionic acid sodium salt in distilled water gave a clean salty taste with almost none of the bitter taste normally associated with potassium chloride present. There was a slight non-objectionable sweet aftertaste.

EXAMPLE 3

An aqueous solution containing 2% by weight potassium chloride, 0.1% by weight sodium chloride and 0.04% by weight 2(4-methoxyphenoxy)propionic acid sodium salt gave a very clean sodium chloride-like taste with virtually no bitterness normally associated with potassium chloride present. There was a very slight, sweet aftertaste.

EXAMPLE 4

An aqueous solution containing 2% by weight potassium chloride, 0.1% by weight sodium chloride and 0.02% by weight 2(4-methoxyphenoxy)propionic acid sodium salt gave a clean sodium chloride-like taste with virtually none of the bitterness normally associated with potassium chloride present. A slight, sweet non-objectionable aftertaste was also observed. This preparation seemed to have a slightly less potent salt taste than Example 3 above.

EXAMPLE 5

An aqueous solution containing 2.25% by weight potassium chloride and 0.07% by weight L-aspartyl-L- phenylalanine mono potassium salt gave a completely bitter-free salty taste. There was no aftertaste associated with this composition.

EXAMPLE 6

An aqueous solution containing 2.25% by weight potassium chloride and 0.045% by weight L-aspartyl-L-phenylalanine mono potassium salt gave a clean, salty taste with no accompanying bitter taste. There was also no observed aftertaste.

EXAMPLE 7

An aqueous solution containing 2.25% by weight potassium chloride and 0.0225% by weight L-aspartyl-L-phenylalanine mono potassium salt in distilled water gas a clean, salty taste free of the bitter taste normally associated with potassium chloride. There was no aftertaste associated with this sample.

EXAMPLE 8

An aqueous solution containing 2% by weight sucrose and 0.4% by weight L-aspartyl-L-phenylalanine mono potassium salt completely eliminated the sweet taste of sucrose. There was no aftertaste associated with this sample.

EXAMPLE 9

An aqueous solution containing 1% by weight sodium chloride and 0.1% 2(4-methoxyphenoxy)propionic acid had a substantially saltier taste than 1% sodium chloride alone. There was a slight non-objectionable sweet aftertaste associated with this sample.

EXAMPLE 10

An aqueous solution containing 2.25% by weight potassium chloride and 0.044% 3(3,4-dimethoxyphenyl) propionic acid in distilled water gave a bitter-free salty taste. There was a slight sweet or metallic sweet saccharin-like aftertaste.

EXAMPLE 11

An aqueous solution containing 2.25% by weight potassium chloride and 0.08% by weight 2,5 dihydroxy benzoic acid sodium salt was nearly absent of the characteristic potassium chloride bitter taste.

EXAMPLE 12

The bitter/metallic after-taste was eliminated from a 0.1% solution of sodium saccharin containing 0.01% 2-(4-methoxyphenoxy)propionic acid.

EXAMPLE 13

Addition of the known bitter inhibitor neodiosmin to a 2% solution of sucrose completely eliminates the sweet taste.

EXAMPLE 14

(−)-2-(4-methoxyphenoxy)propionic acid sodium salt at 0.04% in water completely eliminates the bitter taste of a 2.25% solution of potassium chloride, with no aftertaste.

It is claimed:

1. An ingestible product comprising a substance having bitter taste characteristics and a bitter taste-reducing amount of at least one substantially tasteless sweetness inhibitor, wherein the inhibitor has the structure:

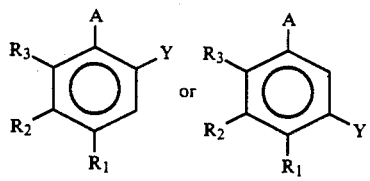

wherein A is COOH or SO$_3$H, Y is hydroxy and R$_1$, R$_2$ and R$_3$ are hydrogen, alkyl, cyclo-propyl, OH, OCH$_3$, OCH$_2$CH$_3$, CH$_2$OCH$_3$, CH$_2$CH$_2$OH, CH(CH$_3$)$_2$CH$_2$OH, CHO, COCH$_3$, CH$_2$CHO, COOH, CH$_2$COOH, COOCH$_3$, OCOCH$_3$, CONH$_2$, NHCHO, F, Cl, Br, I, CF$_3$, SCH$_3$, SCH$_2$CH$_3$, SO$_3$H, SO$_2$NH$_2$ SOCH3, CH$_2$SO$_3$H and CH$_2$SONH$_2$
and the physiologically acceptable salts thereof, said amount of tasteless sweetness inhibitor reducing said bitter taste without substantially reducing sweetness.

2. An ingestible product according to claim 1 wherein the inhibitor is a 2,4-dihydroxybenzoic acid and physiologically acceptable salts thereof.

3. A method of reducing the bitter taste in substances having both bitter and desirable taste characteristics without inhibiting the desirable taste characteristics which comprises incorporating in said substance a bitter-taste-reducing amount of at least one substantially tasteless sweetness inhibitor, wherein the inhibitor has the structure:

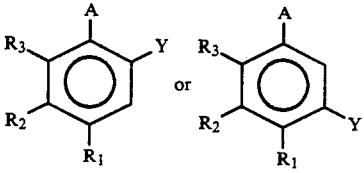

wherein A is COOH or SO$_3$H, Y is hydroxy and R$_1$, R$_2$ and R$_3$ are hydrogen, alkyl, cyclo-propyl, OH, OCH$_3$, OCH$_2$CH$_3$, CH$_2$OCH$_3$, CH$_2$CH$_2$OH, CH(CH$_3$)$_2$CH$_2$OH, CHO, COCH$_3$, CH$_2$CHO, COOH, CH$_2$COOH, COOCH$_3$, OCOCH$_3$, CONH$_2$, NHCHO, F, Cl, Br, I, CF$_3$, SCH$_3$, SCH$_2$CH$_3$, SO$_3$H, SO$_2$NH$_2$ SOCH3, CH$_2$SO$_3$H and CH$_2$SONH$_2$;
and the physiologically acceptable salts thereof, said amount of tasteless sweetness inhibitor reducing said bitter taste without substantially reducing sweetness.

4. A method according to claim 3 wherein the inhibitor is 2,4-dihydroxybenzoic acid and physiologically acceptable salt thereof.

5. An ingestible product comprising an inorganic salt having both bitter and desirable taste characteristics and a bitter taste-reducing amount of at least one substantially tasteless sweetness inhibitor.

6. An ingestible product comprising potassium chloride and a bitter taste-reducing amount of at least once substantially tasteless sweetness inhibitor.

7. An ingestible product comprising a substance having bitter taste characteristics and sodium chloride or ammonium chloride and a substantially tasteless sweetness inhibitor having the structure:

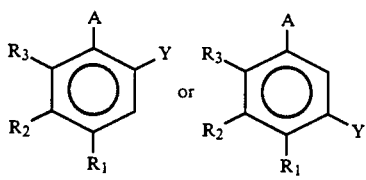

wherein A is COOH or SO₃H, Y is hydroxy and R$_1$, R$_2$ and R$_3$ are hydrogen, alkyl, cyclo-propyl, OH, OCH$_3$, OCH$_2$CH$_3$, CH$_2$OCH$_3$, CH$_2$CH$_2$OH, CH(CH$_3$)$_2$CH$_2$OH, CHO, COCH$_3$, CH$_2$CHO, COOH, CH$_2$COOH, COOCH$_3$, OCOCH$_3$, CONH$_2$, NHCHO, F, Cl, Br, I, CF$_3$, SCH$_3$, SCH$_2$CH$_3$, SO$_3$H, SO$_2$NH$_2$ SOCH3, CH$_2$SO$_3$H and CH$_2$SONH$_2$;

and physiologically acceptable salts thereof, in an amount that both reduces the bitter taste and enhances the salty taste of the sodium chloride or ammonium chloride.

8. An ingestible product comprising potassium chloride and sodium chloride or ammonium chloride and a tasteless sweetness inhibitor having the structure:

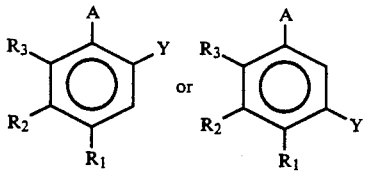

wherein A is COOH or SO₃H, Y is hydroxy and R$_1$, R$_2$ and R$_3$ are hydrogen, alkyl, cyclo-propyl, OH, OCH$_3$, OCH$_2$CH$_3$, CH$_2$OCH$_3$, CH$_2$CH$_2$OH, CH(CH$_3$)$_2$CH$_2$OH, CHO, COCH$_3$, CH$_2$CHO, COOH, CH$_2$COOH, COOCH$_3$, OCOCH$_3$, CONH$_2$, NHCHO, F, Cl, Br, I, CF$_3$, SCH$_3$, SCH$_2$CH$_3$, SO$_3$H, SO$_2$NH$_2$ SOCH3, CH$_2$SO$_3$H and CH$_2$SONH$_2$;

and physiologically acceptable salts thereof, in an amount that both reduces the bitter taste and enhances the salty taste of the sodium chloride or ammonium chloride.

* * * * *